Nov. 16, 1948.  S. SHATKIN  2,453,867
COSMETIC HOLDER
Filed Dec. 27, 1946
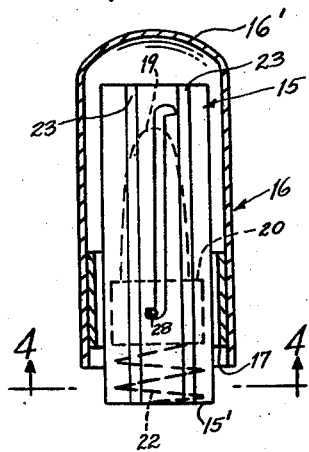
Fig. 1.
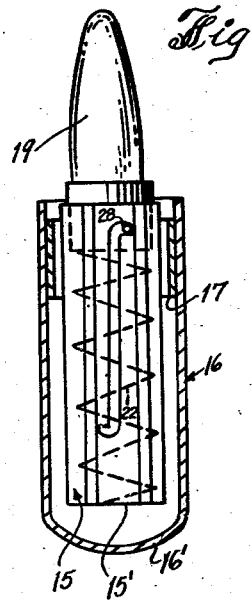
Fig. 2.
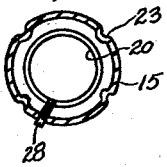
Fig. 4.
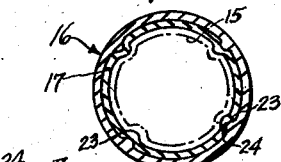
Fig. 5.
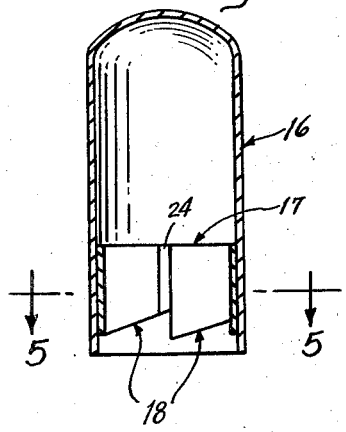
Fig. 3.
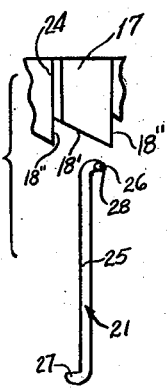
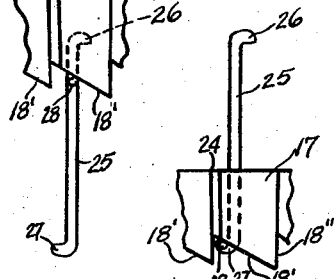
Fig. 6.  Fig. 7.  Fig. 8.
SIDNEY SHATKIN,
Inventor.
By: [signature]
Attorney.

Patented Nov. 16, 1948

2,453,867

UNITED STATES PATENT OFFICE 2,453,867

COSMETIC HOLDER

Sidney Shatkin, Long Branch, N. J., assignor to Crest Silver Mfg. Co. Inc., Matawan, N. J., a corporation of New Jersey Application December 27, 1946, Serial No. 718,795

8 Claims. (Cl. 206—56)

The present invention relates to lip stick holders and more particularly to the type including a casing for housing the pomade stick, and from which it can be made to extend when required for use.

An object of this invention is to provide a lip stick holder of the type mentioned, of novel and improved construction comprising a minimum of parts, and which is comparatively simple and cheap to manufacture.

Another object hereof is to provide a novel and improved lip stick holder of the character set forth, wherein the stick is automatically locked against movement longitudinally with respect to the casing, at its limit positions, by ordinary manipulation of the casing's cover.

A further object of this invention is to provide a lip stick holder comprised of very few parts and having a novel mode of operation.

Another object hereof is to provide a novel and improved article of the kind described, which is easy to use and which is efficient in carrying out the purposes for which it is designed.

Other objects and advantages will become apparent as this disclosure proceeds.

In the accompanying drawings forming part of this application, similar characters of reference indicate corresponding parts in all the views.

Fig. 1 is a front view of a lip stick holder embodying the teachings of this invention, shown partly in longitudinal section, in condition when not in use.

Fig. 2 is a similar view when the article is in use.

Fig. 3 is a central longitudinal section of the cap or casing's cover included in this article. This component includes a cam means adapted for shifting a lip stick carrier positioned within the casing, into and out of positions where said carrier is locked against movement longitudinally with respect to the casing.

Fig. 4 is a partial section taken at lines 4—4 in Fig. 1.

Fig. 5 is a section taken at lines 5—5 in Fig. 3.

Figs. 6, 7 and 8 are fragmentary diagrammatic representations, respectively showing the progressive steps of the movement of the carrier by the cam means aforesaid.

In the drawings, the embodiment illustrated to explain this invention, includes a tubular casing 15, closed at its bottom 15', and a cap 16 therefor, having a closed top 16'. Secured concentrically to the interior of said cap 16, is a ring 17, the rim of which is near the open end of cap 16, and is fashioned with ratchet-type teeth 18. Each of said teeth has a vertical edge 18'' and an inclined edge 18'.

A cosmetic stick 19, mounted extending upwardly from a cup member or carrier 20, is positioned within the casing 15. A pin 28, extending laterally from the carrier 20, extends through a slot through the wall of the casing 15, indicated by the numeral 21 generally. A coil spring 22, is within the casing 15, under the carrier 20. Said spring may be a compression coil spring, adapted to push the carrier 20 towards the opening of the casing 15, or if desired it can be a tension coil spring, in which event its ends are respectively secured to the bottom 15' of the casing 15, and to the underside of the carrier 20, whereby said carrier is always drawn into the casing.

The casing 15, is provided on its exterior surface with one or more inward beads or channels 23 along its length, preferably equi-spaced if more than one. The ring 17 is provided with channels 24 along its length. Said ring has loose but good fit and is adapted to slide on casing 15, whereby channels 23 are within the channels 24, whereby the cap is maintained against axial rotary movement on casing 15. The channels 24 are preferably along the lines of the vertical tooth edges 18''.

The main portion of slot 21 may be true longitudinal along casing 15, or somewhat off true vertical as shown at 25. The termini of said slot 21, are respectively in opposite horizontal direction, indicated by the numerals 26 and 27 respectively. The width of slot 21 is of a dimension to permit slightly loose fit of pin 28 therethrough, and the termini portions are so designed that when pin 28 is in either of them, the carrier 20 is incapable of vertical movement, as for instance is respectively shown in Figs. 1 and 2. The carrier 20 is cylindrical and capable of axial rotary movement within the casing 15, as would be necessary for pin 28 to enter either of the termini of slot 21. The distance between teeth, meaning the pitch of teeth 18, shall preferably exceed the total travel of pin 28 along the horizontal from its extreme positions in slot portions 26 and 27.

Edge 18' of any of the teeth 18 are adapted to contact pin 28. However, for any one position of cap 16 on casing 15, only one of the teeth 18 can engage said pin 28, and slot 21 is so positioned with respect to such tooth engaging said pin, that for the entire movement of cap 16 onto casing 15, the pin is constantly in contact with some part of the edge 18' of the tooth 18 in engagement with said pin. When only one cooperative pair of channels 23 and 24 are provided, only one tooth 18 is required. Where such pairs of channels are multiple and equispaced, an identical number of teeth 18 are provided, to be so positioned with respect to the slot 21 respectively, in the manner explained.

In operation, in an embodiment where spring 22 is a compression coil spring, and the components arranged as in Fig. 2, remove cap 16 from off the casing 15, and invert said cap. Place cap 16 over the pomade stick 19, and set cap onto casing 15 to cover same. The relative positions of ring 17, slot 21 and pin 28, at such instant is shown diagrammatically in Fig. 6. Now, upon sliding cap 16 downward onto casing 15, edge 18' of tooth 18, will contact pin 28 in slot terminal 26, and act as a cam to shift pin 28 toward and into slot portion 25 and downward along the latter as shown in Fig. 7, until finally pin 28 will be made to enter slot terminal 26, as shown in Fig. 8. Spring 22 is now in stressed condition, and carrier 20 is locked against movement longitudinally along the casing 15. Parts 15 and 16 being incapable of rotary axial movement one relative the other, the device will be in the condition illustrated in Fig. 1.

Now, when it is desired to bring the article into use condition as in Fig. 2, the cap 16 is removed and set onto the bottom of the casing 15 and slid upward thereon, whereupon the above operative occurrences will automatically happen, as may be best seen by turning the sheet of drawings a half turn, and referring to Figs. 6, 7 and 8. Such occurrences are now in reverse order, and movement of the carrier 20 along slot portion 25 is automatically effected by action of the spring 22. The momentum of such carrier, may even cause slot edge portion 26' to act as a cam to shift pin 28 into slot terminal 26.

When the spring 22 instead of being a compression coil, is a tension coil spring, the manner of operation needs no further explanation, in view of above statement of operation, for it is fully evident therefrom. In such embodiment, terminal 27 of slot 21, may be omitted. In the previously described embodiment where a compression spring is used, terminal 26 of slot 21, can be omitted, but its presence is desirable to effect a fixedly held cosmetic stick 19.

The embodiment where the carrier is spring urged into the casing, presents the decided advantage of rather being in the casing instead of cosmetic stick out of the casing in the event of accidental release of spring for action.

This invention is capable of numerous forms and various applications without departing from the essential features herein disclosed. It is therefore intended and desired that the embodiments described herein be deemed illustrative and not restrictive and that the patent shall cover all patentable herein set forth; reference being had to the following claims rather than to the specific description herein to indicate the scope of this invention.

I claim:

1. In a cosmetic holder of the character described, a tubular casing, a tubular cover thereon in telescopic slidable relation therewith and removeable therefrom, adapted to be slid onto the casing from both ends of the casing respectively, means on said casing and cover to maintain same against axial rotation with respect to each other, a carrier for a cosmetic member, positioned within the casing, capable of being slid therealong and axially shifted therein; the wall of the casing being provided with a substantially longitudinal slot therethrough, a pin extending laterally from the carrier and exterior of the casing through said slot, a cam element on the cover, presenting an edge, adapted to contact and push said pin when the cover is slid onto either end of the casing and then along the casing; said slot having a terminal slot portion communicative therewith and lateral thereto; the pin being positioned in said slot terminal; said edge of the cam being so slanted with respect to the longitudinal axis of the cover whereby upon movement of the cover onto and along the casing in the direction from the pin towards the other end of the slot, the cam member will move the pin into the main slot and then therealong to the other end of said slot; the casing having an open end and the carrier being near such end when at one of its limit positions within the casing.

2. An article as defined in claim 1, including a spring within the casing, adapted to urge the carrier towards one end of the casing.

3. An article as defined in claim 1, wherein the lateral terminal portion of the slot is the part of the slot remotest from the open end of the casing and including a spring within the casing, adapted to urge the carrier towards the open end of the casing.

4. An article as defined in claim 1, wherein the lateral terminal portion of the slot is the part of the slot nearest to the open end of the casing and including a spring within the casing, adapted to urge the carrier into the casing.

5. In a cosmetic holder of the character described, a tubular casing, a tubular cover thereon in telescopic sliding relation therewith and removeable therefrom, adapted to be slid onto the casing from both ends of the casing respectively, means on said casing and cover to maintain same against axial rotation with respect to each other, a carrier for a cosmetic member, positioned within the casing, capable of being slid therealong and axially shifted therein; the wall of the casing being provided with a substantially longitudinal main slot therethrough, a pin extending laterally from the carrier and exterior of the casing through said main slot, a cam element on the cover, presenting an edge, adapted to contact and push said pin when the cover is slid onto either end of the casing and then along the casing; said main slot having terminal slot portions communicative therewith; said terminal portions being lateral of the main slot in opposite directions thereof respectively; the pin being positioned in one of the slot termini; said edge of the cam being so slanted with respect to the longitudinal axis of the cover whereby upon movement of the cover onto and along the casing in the direction from the pin towards the other slot terminal, the cam member will move the pin into the main slot and therealong and then into the other slot terminal; the casing having an open end and the carrier being near such end when at one of its limit positions within the casing.

6. An article as defined in claim 5, including a spring within the casing, adapted to urge the carrier towards one end of the casing.

7. An article as defined in claim 5, including a spring within the casing, adapted to urge the carrier towards the open end of the casing.

8. An article as defined in claim 5, including a spring, adapted to urge the carrier into the casing.

SIDNEY SHATKIN.

REFERENCES CITED

The following references are of record in the file of this patent:

UNITED STATES PATENTS

| Number | Name | Date |
| --- | --- | --- |
| 1,236,258 | Brown | Aug. 7, 1917 |
| 1,588,633 | Taylor | June 15, 1926 |
| 1,958,524 | Tooker | May 15, 1934 |

FOREIGN PATENTS

| Number | Country | Date |
| --- | --- | --- |
| 706,160 | France | Mar. 24, 1931 |